United States Patent
Tateson

(10) Patent No.: US 6,941,140 B2
(45) Date of Patent: Sep. 6, 2005

(54) ALLOCATION OF CHANNELS TO RADIO TRANSCEIVERS

(75) Inventor: Richard E. Tateson, Wickham Market (GB)

(73) Assignee: British Telecommunications public limited company, London (GB)

(*) Notice: Subject to any disclaimer, the term of this patent is extended or adjusted under 35 U.S.C. 154(b) by 402 days.

(21) Appl. No.: 10/148,494

(22) PCT Filed: Dec. 1, 2000

(86) PCT No.: PCT/GB00/04601

§ 371 (c)(1),
(2), (4) Date: May 30, 2002

(87) PCT Pub. No.: WO01/50796

PCT Pub. Date: Jul. 12, 2001

(65) Prior Publication Data

US 2002/0173323 A1 Nov. 21, 2002

(30) Foreign Application Priority Data

Dec. 30, 1999 (EP) .............................. 99310635
Dec. 30, 1999 (GB) .............................. 9930835
Jan. 5, 2000 (EP) .............................. 00300005
Jan. 5, 2000 (GB) .............................. 0000108

(51) Int. Cl.$^7$ ............................................. H04Q 7/20
(52) U.S. Cl. .................. 455/434; 455/425; 455/464; 455/67.14; 455/115.2; 455/450; 455/452.1
(58) Field of Search ................ 455/39, 509, 512, 455/513, 515, 516, 434, 425, 464, 450, 452.1, 67.14, 115.2

(56) References Cited

U.S. PATENT DOCUMENTS 5,448,750 A 9/1995 Eriksson
5,657,343 A 8/1997 Schilling
5,809,423 A 9/1998 Benveniste
5,963,865 A * 10/1999 Desgagne et al. .......... 455/450
6,128,498 A 10/2000 Benveniste
6,178,329 B1 1/2001 Chao
6,246,881 B1 6/2001 Parantainen
6,434,130 B1 * 8/2002 Soininen et al. ............ 370/331

* cited by examiner

*Primary Examiner*—Nay Maung
*Assistant Examiner*—Angelica Perez
(74) *Attorney, Agent, or Firm*—Nixon & Vanderhye P.C.

(57) ABSTRACT

Each base station in a network has an antenna which is connected in the conventional way to a transceiver for handling normal call traffic on one or more radio channels. In addition there is another transmitter which transmits a test signal on each of several test channels, one for each radio channel available for use by the main transceiver. The transceiver also has a receiver for detecting the test channels. The system is controlled by a timer which ensures that the transmitter and receiver do not operate at the same time. The receive times may be random, or may be co-ordinated between individual base stations. When the receiver is in operation, it will detect transmissions of the test signals from other base stations. The signal strength is measured and the result is used by a control system to determine a preference value for each channel; the stronger the signal detected, the lower the preference value. The preference value is used to control an amplifier system which controls the signal strength of each channel transmitted by the transmitter. It is also used to control the traffic transceiver by selecting which traffic channels are to be used in accordance with the preference values.

14 Claims, 5 Drawing Sheets

ALLOCATION OF CHANNELS TO RADIO TRANSCEIVERS

This application is the U.S. national phase of international application PCT/GB00/04601 filed Dec. 1, 2000 which designated the U.S. This application is also related to my copending commonly assigned application Ser. No. 09/647,737 filed Oct. 4, 2000.

BACKGROUND OF THE INVENTION

1. Field of the Invention

This invention relates to the allocation of channels to radio transceivers in a radio network. The described embodiments are directed to the fixed base stations of a cellular telephone network, but the invention may also find application in other networks of radio transmitters and/or receivers.

2. Related Art

A cellular telephone network consists of a number of fixed base station transceivers and a much larger number of mobile handsets which communicate with base stations via a radio channel. The 'cells' from which cellular telephone networks get their name are the coverage areas of the individual fixed radio base stations. Each operator is permitted to use a limited number of radio channels, and there are not enough such channels for each phone call in the network to be carried on a different channel. Thus a central principle of such networks is channel re-use: at any time many base stations may be operating on each channel. This introduces the possibility of interference between phone calls. Interference from other calls using the same channel is known as 'co-channel interference'. 'Adjacent channel' interference, due to another call using a different channel, is also a problem: a call made on a channel corresponding to a frequency band of 4000–4025 kHz is liable to interference from a call on the adjacent band; 4025–4050 kHz. Adjacent channel interference can occur between two calls in the same cell, as well as between adjacent cells.

The problem facing the network operator is to allocate channels to base stations such that demand for channels across the network is met, while keeping interference within acceptable levels. These aims are clearly in conflict: if more channels are allocated to each base station, then each channel must be used by more base stations, and so it is harder to plan to avoid unacceptable interference.

An added difficulty is that the demand across the network is neither uniform nor static. Some cells will experience high demand at particular times of the day but lower than average demand for the rest of the day, for example cells through which major arteries of commuter traffic pass. Even worse, for efficient channel allocation, are the unpredictable fluctuations in demand resulting from events such as road congestion, disruptions to train services, or events attracting the attention of the news media.

It is currently common practice for operators to use a fixed channel allocation plan. The channels used by any particular base station are determined by a "frequency plan". This plan is modified periodically to meet quality of service criteria, for example to meet changes in demand, and to allow for the installation of new base stations. During the existence of one frequency plan, each base station has its own allocation of channels, which remains the same throughout the life of the plan, which is typically several months.

The applicant already has an International patent Application (WO99/56488) which discloses a method for channel allocation in which each base station is an autonomous negotiating unit. Each base station transceiver has a preference value (between 0 and 1) for each of the channels available to the overall channel allocation plan. The base station adjusts its preference values for each channel on the basis of its neighbours' preferences for the same channel. The greater its neighbours' preference for a channel, the greater the reduction in that base station's preference for the same channel. Initially all base stations have approximately the same preference for all channels but, over time, heterogeneity emerges, and is magnified by inhibitory feedback between cells. A particular base station eventually has significant preferences for certain channels, but its preference for all other channels will be low due to inhibition from neighbours.

At any time this heterogeneous set of preferences can be turned into a viable channel allocation plan by applying an algorithm which takes the highest preference channels in each base station and allocates them to that base station for actual use in communicating with handsets.

During the process, in each base station the adjustment to each preference for each channel is proportional to the inhibition from all neighbours. Inhibition is calculated as follows: for each neighbour the preference of that neighbour for the same channel is multiplied by a coefficient obtained from a look-up table representing the strength of potential interference from that neighbour (i.e. the degree of co-channel interference which would result if the base station and this neighbour actually used the same channel to communicate with their handsets). For near neighbours this coefficient will generally be high whilst for distant neighbours it will be low. There may be exceptions in which a geographically distant neighbour is able (due to some quirk of the terrain and the properties of radio wave propagation) to interfere strongly. This would be reflected in a high coefficient. Conversely, local topography may inhibit interference between geographically close neighbours. The total inhibition experienced is simply the sum of all the inhibitions calculated for all neighbours on the channel in question.

The values assigned to the coefficients are important for the quality of the channel allocation produced by this method. If a coefficient is not an accurate reflection of the strength of inhibition from the neighbour to the base station, then when the channels are allocated and used in a real system there is likely to be higher interference than expected. This is a common problem with optimisation techniques: the quality of the solutions depend on how accurately the search space represents the reality in which the solution must perform.

The process of compiling the look-up table requires a mobile monitoring unit (a "man in a van") to measure signal strength at various positions in the network. The attenuation of a signal from that base station to the monitor's position can then be calculated from the signal strength measured by the monitoring unit. This work is time consuming. It is preferably carried out at times of low traffic (e.g. middle of the night) so that a base station can devote itself to transmitting test signals of known power. If test signals are used which are not part of that base station's current frequency allocation they may interfere with signals from other nearby base stations. Moreover, even if a highly accurate table has been produced it only remains accurate until changes are made to the network. If a new base station is constructed the table is outdated. Changes in local topography, such as the construction or demolition of buildings, seasonal effects such as whether trees are in leaf, or even a change in the weather, can also affect the accuracy of a table painstakingly constructed under the previous conditions.

BRIEF SUMMARY OF THE INVENTION

According to an exemplary embodiment of the present invention there is provided a communication channel allocation process for a radio transceiver network in which each transceiver has the potential to use all available communication channels, and processes a combination of interactions between the transceivers, causing each transceiver of the network to inhibit its neighbours from using a given communication channel, to generate a preference value for each communication channel in each transceiver indicative of the level of interference to be expected on that communication channel by that transceiver, characterised in that each transceiver transmits a set of test signals each representative of a respective one of the communication channels, each transceiver measures the strength of the interfering test signals received from the other transceivers, and adjusts the power of each test signal it transmits in accordance with the strength of the respective received interfering test signals, the preference value for each communication channel being determined by the strength of the respective received interfering test signals.

According to another aspect there is provided a radio transceiver comprising communication channel selection means for selecting radio channels, the selection means having means for processing interactions between the transceiver and neighboring transceivers, causing the transceiver to inhibit, or be inhibited by, its neighbours from using individual channels, by generating a preference value for each communication channel indicative of the level of interference to be expected on that communication channel by that transceiver, characterised in that the transceiver comprises means for transmitting a set of test signals each representative of a respective one of the communication channels, means for measuring the strength of interfering test signals received from other transceivers, and means for adjusting the power of each test signal it transmits in accordance with the strength of the respective received interfering test signals, and means for determining the strengths of the respective received interfering test signals, and deriving the preference value for each communication channel therefrom.

In this exemplary embodiment the table of coefficients used in the above-mentioned patent application is replaced with signal strength measurements made by the transceivers themselves. The transceivers co-operate by transmitting and receiving test signals in order to generate these measurements.

Each base station transceiver uses its allocated communication channels to handle normal traffic, signalling and data transfer to and from mobile handsets. So, for example, a particular transceiver might be communicating with fourteen handsets using two channels (seven timeslots in each channel).

In addition the transceiver transmits a signal on each of a special set of 'inhibition signalling' channels. There is one of these inhibition signalling channels for every one of the communication channels available to the allocation plan, but they occupy much less spectrum because each channel is of much narrower bandwidth. Each inhibition signalling channel should be close in the radio spectrum to the communication channel to which it relates, so that dispersion characteristics are similar. If there is sufficient capacity, the inhibition signalling channel may be carried in a spare time or frequency slot in the communication channel itself. The strength of the transmission on each inhibition signalling channel is proportional to the currently-held preference value of that transceiver for the corresponding communication channel. It should be noted that each inhibition signalling channel has to be transmitted from each transceiver, whether or not it is currently allocated the associated communication channel. It is envisaged that the efficiency gain from the use of this dynamic allocation process would more than match the loss of bandwidth due to setting aside inhibition channels.

A transceiver cannot measure signal strength from all its neighbours while simultaneously broadcasting on that same frequency, because it would detect its own transmissions reflected from nearby objects. In other words, a transceivers should not transmit and receive on the same frequency at the same time. The transceiver spends the majority of its time in transmit mode, with brief "listening" periods interspersed. The timing of the listening would depend on the size of the network. In a small, synchronised network it would be possible to give each transceiver a unique listening period. Thus when one transceiver was listening, all the others would be transmitting. In a large or asynchronous network listening would occur at random. Thus when one transceiver was listening, some other transceivers might also be listening. This means that at that instant, the listening transceiver cannot hear a subset of the rest of the network. However, next time it listens it will be a different, random, subset which is silent so over the course of several listening periods (which, though brief, can be frequent) the transceiver will receive signals from all other transceivers within radio range.

Interference can occur even between cells whose base stations are screened from each other, for example by a hill, if a mobile unit is within range of both base stations, (for example on top of that hill. To allow base stations to detect such sources of interference, mobile units may also be arranged to transmit on the inhibition signalling channels. This allows a base station to detect potential sources of interference located in nearby cells even when the base stations of such nearby cells are not themselves sources of interference. The mobile units may include in their transmissions an indication of their identity, or that of the base station they are currently working to, to allow that base station to identify them and disregard them as sources of interference. Alternatively they may be controlled by their current base station such that they only transmit the inhibition signal when their current base station is also transmitting it.

Each base station measures signal strength on each of the inhibition signalling channels (disregarding any signals from mobile units currently co-operating with it, identified by their transmitted identity code, or that of the base station). These values are then used to determine the total inhibition of the base station's own preferences for each channel.

Throughout this process, the base station can continue to co-operate with mobile units on normal call traffic using its allocated communication channels.

The exemplary embodiment removes the need for, and reliance on, a table of interference strength coefficients. This eliminates the effort of compiling the table, and avoids the inaccuracies in the table previously referred to.

These advantages may be particularly important in situations where the network itself is changing rapidly, as dynamically measuring/self-adjusting transceivers may be suitable for circumstances where an accurate table cannot be drawn up. One possible application where the network is highly changeable is in military mobile communications. When an army advances it moves its 'base stations' forward as well as, of course, moving the 'handsets'. The alternative, in a traditional channelized radio network, would be very inefficient use of bandwidth, which could become important as the data rate required for military communications rises.

Another application could be in future active networks (which can dynamically vary their connectivity). The analogy would be that where the proposed mobile network would use the radio spectrum to negotiate for channels as well as transmitting data, the active network would send negotiation signals along with data packets. Thus, rather than having a look-up table of neighbours, it would listen for negotiation signals and use them to dynamically construct its picture of the neighbourhood.

BRIEF DESCRIPTION OF THE DRAWINGS

An exemplary embodiment of the invention will now be described in more detail, with reference to the attached Figures, in which

FIG. 5 illustrates two possible channel allocation plans for the system of the invention.

DETAILED DESCRIPTION OF EXEMPLARY EMBODIMENTS

Figure 1:
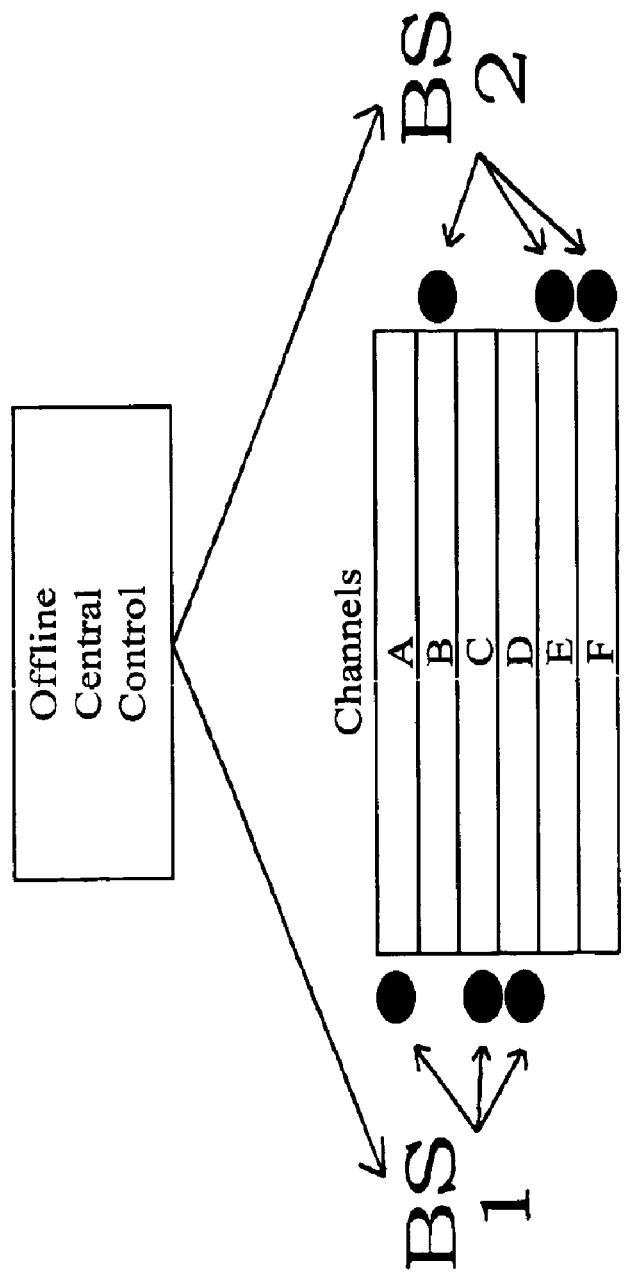
FIG. 1 illustrates conventional channel allocation practice.
Figure 2:
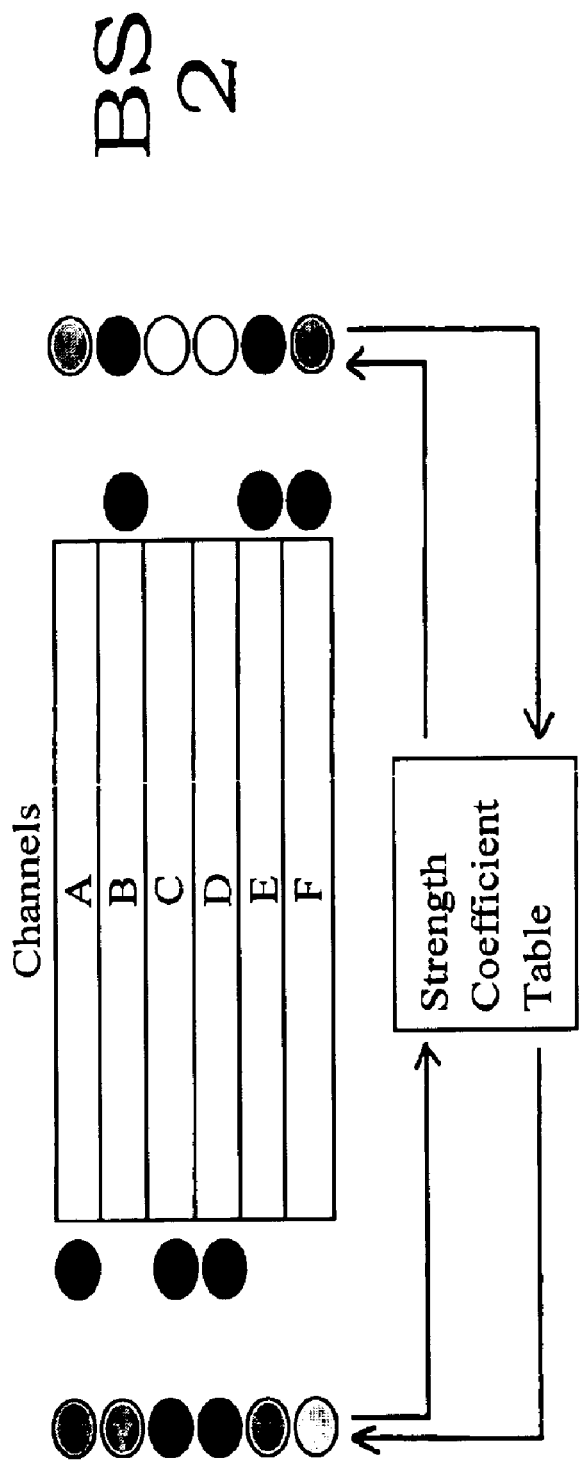
FIG. 2 illustrates the principles of the invention described in the prior art application WO99/56488
Figure 3:
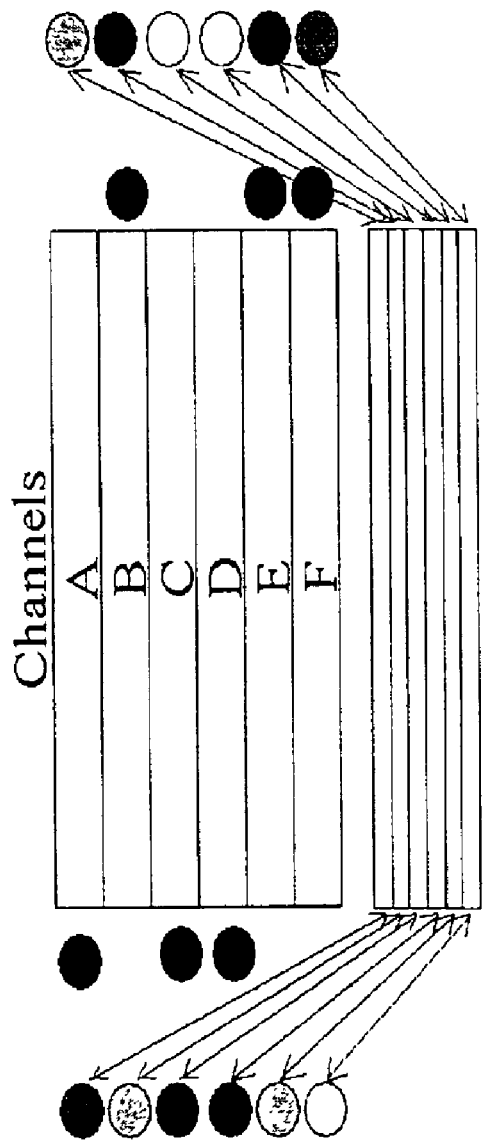
FIG. 3 illustrates the principles of the present invention

In FIGS. 1 to 3 two base station transceivers BS1, BS2 are shown, which both have access to six traffic channels A,B,C,D,E,F. In the Prior Art system of FIG. 1 a central controller determines the optimal allocation. This happens 'offline' based on interference and blocking data collected over a period of time. The optimal allocation is then imposed on the network. The optimal allocation is indicated by the markers in FIG. 1, in which Channels A,C,D are allocated to BS1 and channels B,E,F to BS2.

FIG. 2 shows the allocation method of the prior art system disclosed in WO99/56488. Each base station holds a set of preference values, indicated by the graduated shading of the six channel markers in FIG. 2. The base stations communicate these preferences to other base stations in the network, which multiply them by the relevant coefficient in the globally agreed strength coefficient table. The resulting values are used as inhibitory pressures on the preference values in the other base stations. When selecting channels, each base station then uses the channels for which it has the highest preference values. The process may be carried out as a simulation, the resulting preferences being communicated to the base stations when the simulation has been run, or each base station may carry out its own part of the process, using a strength coefficient table prepared in advance.

FIG. 3 shows the principles of the present exemplary embodiment of the invention. As in FIG. 2 the base stations hold preference values for all channels. The difference is that these preference values are communicated as a set of signal strengths (amplitudes) over a set of radio channels to any neighbours within range, which then use the strengths of the signal to determine the inhibitory pressure on their own preference values for those channels.

Figure 4:
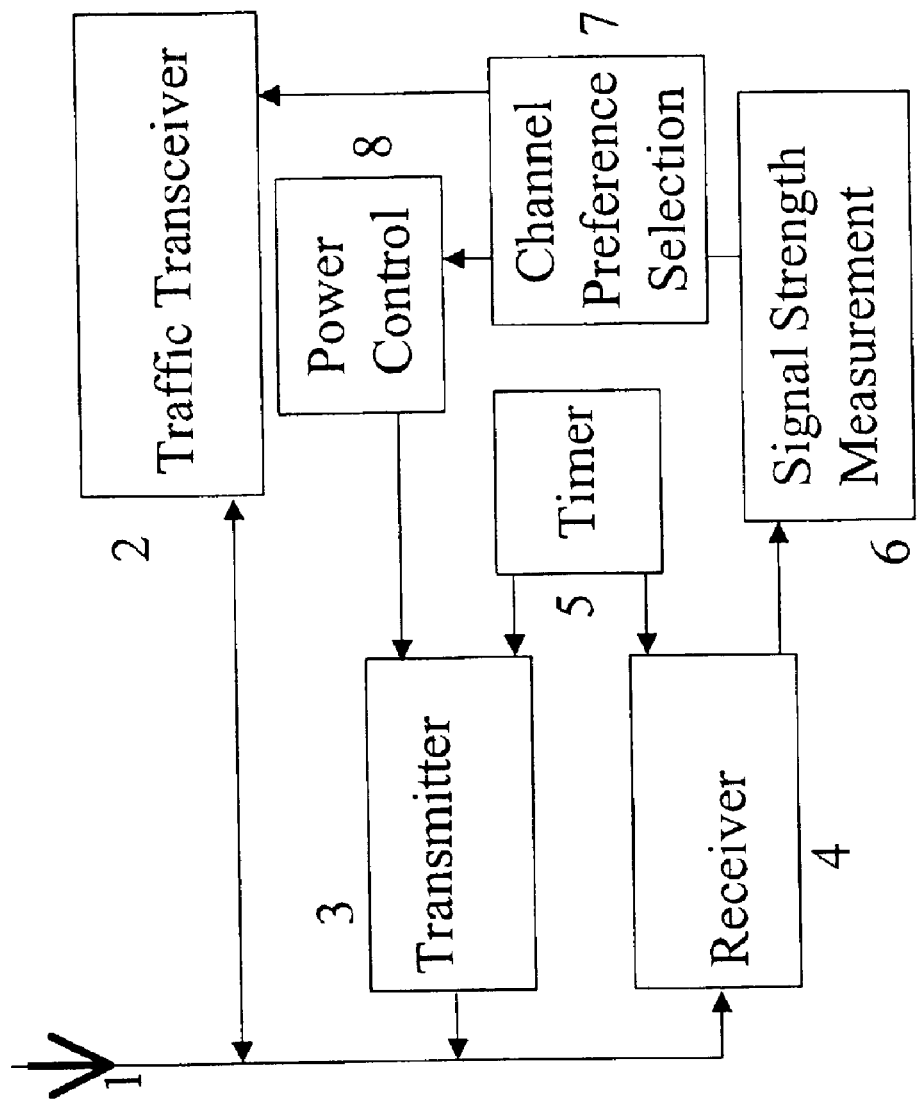
FIG. 4 illustrates a base station transceiver according to the invention

FIG. 4 illustrates schematically a base station transceiver arranged to operate in this system. It will be appreciated that the system requires the co-operation of several such base station transceivers. The base station has an antenna 1 which is connected in the conventional way to a transceiver 2 for handling normal call traffic on one or more radio channels. In addition there is another transmitter 3 which transmits a test signal on each of several test channels, one for each radio channel available for use by the main transceiver 2. As shown in FIG. 5, these test channels 21,22,23,24,25,26 may be arranged in the radio spectrum between the traffic channels 11,12,13,14,15,16 (FIG. 5a), as a set of separate channels arranged together close to the traffic channels (FIG. 5b) as time slots 31,32,33,34,35,36 within their respective traffic channels (FIG. 5c), or as time slots within a single dedicated test channel 20 (FIG. 5d).

Each transceiver also has a receiver 4 for detecting the test channels. The system is controlled by a timer 5 which ensures that the transmitter 3 and receiver 4 do not operate at the same time. The receive times of an individual base station may be random, or may be coordinated between individual base stations.

When the receiver 4 is in operation, it detects transmissions of the test signals from other base stations. The signal strength is measured (measurement system 6) and the result is used by a control system 7 to determine a preference value for each channel: the stronger the signal detected, the lower the preference value.

The preference value is used to control an amplifier system 8 which controls the signal strength of each channel transmitted by the transmitter 3. It is also used to control the traffic transceiver 2, by selecting which traffic channels are to be used in accordance with the preference values.

Remote transceiver units co-operating with the transceiver, such as mobile units or repeaters, may also transmit on the inhibition signalling channel. The mobile units include in their transmissions an indication of their identity, or that of the base station they are currently working to, to allow the receiver 4 to identify them and disregard them as sources of interference. Alternatively they may be controlled by the base station such that they only transmit when the base station transmitter 3 is also transmitting (and therefore the receiver 4 is not operating).

What is claimed is:

1. A communication channel allocation process for a radio transceiver network in which the process starts with each transceiver having the potential to use all available communication channels, interactions between the transceivers causing each transceiver of the network to inhibit its neighbors from using a given communication channel bygenerating a preference value for each communication channel in each transceiver indicative of the level of interference to be expected on that communication channel by that transceiver, said process comprising:

transmitting a set of test signals from each transceiver, each test signal being representative of a respective one of the communication channels, measuring the strength of the interfering test signals at each transceiver received from the other transceivers; and adjusting the power of each test signal a transceiver transmits in accordance with the strength of the respective received interfering test signals, the preference value for each communication channel at a given transceiver being determined by the strength of the respective received interfering test signals.

2. A process as in claim 1, wherein each base station selects communication channels for use in accordance with the respective preference values so generated.

3. A process as in claim 1 in which each transceiver transmits a signal on each of a set of inhibition signalling channels, there being one such inhibition signalling channel for each one of the communication channels, the strength of the transmission on each inhibition signalling channel being proportional to the current preference value of that transceiver for the corresponding communication channel.

4. A process as in claim 1 wherein each transceiver alternates between a transmission mode and a reception mode.

5. A process as in claim 4, wherein the transceivers are synchronized such that when one transceiver is in reception mode, all the other transceivers are in transmission mode.

6. A process as in claim 4, wherein the transceivers switch between reception mode and transmission mode at random.

7. A process as in claim 4, wherein remote units co-operating with each transceiver are arranged to transmit the test signals at the same time as their respective transceivers.

8. A radio transceiver comprising:

communication channel selection means for selecting radio channels, the selection means having means for processing interactions between the transceiver and neighboring transceivers, causing the transceiver to inhibit, or be inhibited by, its neighbours from using individual channels, by generating a preference value for each communication channel indicative of the level of interference to be expected on that communication channel by that transceiver, means for transmitting a set of test signals each representative of a respective one of the communication channels, means for measuring the strength of interfering test signals received from other transceivers, means for adjusting the power of each test signal it transmits in accordance with the strength of the respective received interfering test signals, and means for determining the strengths of the respective received interfering test signals, and deriving the preference value for each communication channel therefrom.

9. A radio transceiver as in claim 8, having means for selecting communication channels for use in accordance with the respective preference values so generated.

10. A transceiver as in claim 8 arranged to transmit a signal on each of a set of inhibition signaling channels, there being one such inhibition signaling channel for each one of the communication channels, the strength of the transmission on each inhibition signaling channel being proportional to the current preference value of the transceiver for the corresponding communication channel.

11. A transceiver as in claim 8 further comprising control means to cause the transceiver to alternate between a transmission mode and a reception mode.

12. A transceiver as in claim 11, wherein the control means is arranged to co-operate with similar transceivers such that when one transceiver is in reception mode, all the other transceivers are in transmission mode.

13. A transceiver as in claim 11, wherein the control means causes the transceiver to switch between reception mode and transmission mode at random.

14. A transceiver as in claim 11 comprising means to control co-operating remote units to transmit on the test channels at the same time as the respective transceiver.

* * * * *